United States Patent
Kishita

(10) Patent No.: US 8,782,672 B2
(45) Date of Patent: Jul. 15, 2014

(54) CONTROL APPARATUS, CONTROL METHOD, AND RECORDING MEDIUM

(75) Inventor: Yuri Kishita, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 273 days.

(21) Appl. No.: 13/054,334

(22) PCT Filed: Jul. 29, 2009

(86) PCT No.: PCT/JP2009/003581
§ 371 (c)(1),
(2), (4) Date: Jan. 14, 2011

(87) PCT Pub. No.: WO2010/013460
PCT Pub. Date: Feb. 4, 2010

(65) Prior Publication Data
US 2011/0131590 A1    Jun. 2, 2011

(30) Foreign Application Priority Data

Jul. 30, 2008   (JP) ................................. 2008-196521

(51) Int. Cl.
  *G06F 3/00*   (2006.01)
  *G06F 9/54*   (2006.01)
(52) U.S. Cl.
  CPC ............... *G06F 9/547* (2013.01); *G06F 9/541* (2013.01)
  USPC .......................................... 719/328; 719/330
(58) Field of Classification Search
  CPC ................................. G06F 9/547; G06F 9/541
  USPC .................................................. 719/328, 330
  See application file for complete search history.

(56) References Cited

U.S. PATENT DOCUMENTS

| 6,990,672 B2 * | 1/2006 | Maguire et al. ............... 719/328 |
| 7,644,288 B2 * | 1/2010 | Kawaura et al. ............. 713/191 |
| 7,737,826 B2 * | 6/2010 | Tamura .................... 340/286.02 |

(Continued)

FOREIGN PATENT DOCUMENTS

| JP | A-07-108882 | 4/1995 |
| JP | A-2001-270399 | 10/2001 |

(Continued)

OTHER PUBLICATIONS

James H. Cowie, Scalable Simulation Framework API Reference Manual, Mar. 25, 1999.*

(Continued)

*Primary Examiner* — Lechi Truong
(74) *Attorney, Agent, or Firm* — Oliff PLC

(57) ABSTRACT

A control apparatus, a control method and a computer program are provided that are capable of shortening the developmental process and reducing the developmental load by enabling control that flexibly handles various required specifications and improving the reusability of programs. Functions implemented in an application layer and a platform layer are implemented by constructing a function framework which is an aggregate of components that implement detailed functions related with attributes such as a function or a role. The attribute information may be provided in a plurality of pieces, and when a function framework is constructed, a function framework conforming to various specifications can be constructed according to the selection of the attribute information.

8 Claims, 10 Drawing Sheets

(56) References Cited

U.S. PATENT DOCUMENTS

| | | | |
|---|---|---|---|
| 7,809,914 B2* | 10/2010 | Kottomtharayil et al. | 711/170 |
| 2001/0025216 A1 | 9/2001 | Nishimura et al. | |
| 2003/0023839 A1 | 1/2003 | Burkhardt et al. | |
| 2003/0044092 A1* | 3/2003 | Tanaka | 382/325 |
| 2003/0083917 A1* | 5/2003 | Tracey et al. | 705/7 |
| 2004/0128037 A1 | 7/2004 | Miyamoto et al. | |
| 2004/0268353 A1 | 12/2004 | Kanai et al. | |
| 2005/0055154 A1 | 3/2005 | Tanaka et al. | |
| 2006/0004801 A1* | 1/2006 | Hoefer et al. | 707/101 |
| 2006/0080288 A1* | 4/2006 | MacLaurin et al. | 707/3 |
| 2006/0111825 A1 | 5/2006 | Okada et al. | |
| 2007/0057910 A1 | 3/2007 | Chen | |
| 2007/0168453 A1* | 7/2007 | Ito et al. | 709/213 |
| 2008/0068144 A1 | 3/2008 | Sato | |
| 2008/0148299 A1* | 6/2008 | Daherkar et al. | 719/330 |
| 2008/0282249 A1 | 11/2008 | Kanai et al. | |
| 2011/0225160 A1* | 9/2011 | Sonoda | 707/739 |

FOREIGN PATENT DOCUMENTS

| | | |
|---|---|---|
| JP | A-2002-202887 | 7/2002 |
| JP | A-2002-259643 | 9/2002 |
| JP | A-2003-099268 | 4/2003 |
| JP | A-2003-202990 | 7/2003 |
| JP | A-2004-192541 | 7/2004 |
| JP | A-2004-536391 | 12/2004 |
| JP | A-2005-018610 | 1/2005 |
| JP | A-2005-075314 | 3/2005 |
| JP | A-2006-142994 | 6/2006 |
| JP | A-2006-327216 | 12/2006 |
| JP | A-2007-035013 | 2/2007 |
| JP | A-2007-047941 | 2/2007 |
| JP | A-2007-128432 | 5/2007 |
| JP | A-2007-226685 | 9/2007 |
| JP | A-2007-329578 | 12/2007 |
| JP | A-2008-074124 | 4/2008 |
| WO | WO 03/001366 A1 | 1/2003 |
| WO | WO 2007/032911 A1 | 3/2007 |

OTHER PUBLICATIONS

Japanese Office Action issued in Application No. 2008-196521; Dated Mar. 13, 2012 (With Partial Translation).

Tamura et al., "Software Retrieval System Using Categories of Facet Classification," *IPSI SIG Technical Report*, vol. 2006, No. 35, Mar. 24, 2006, pp. 105-112 (With Abstract).

International Search Report issued in Application No. PCT/JP2009/003581; Dated Sep. 1, 2009.

Japanese Office Action issued in Application No. 2008-196521; Dated Oct. 25, 2011 (With Translation).

* cited by examiner

F I G. 4
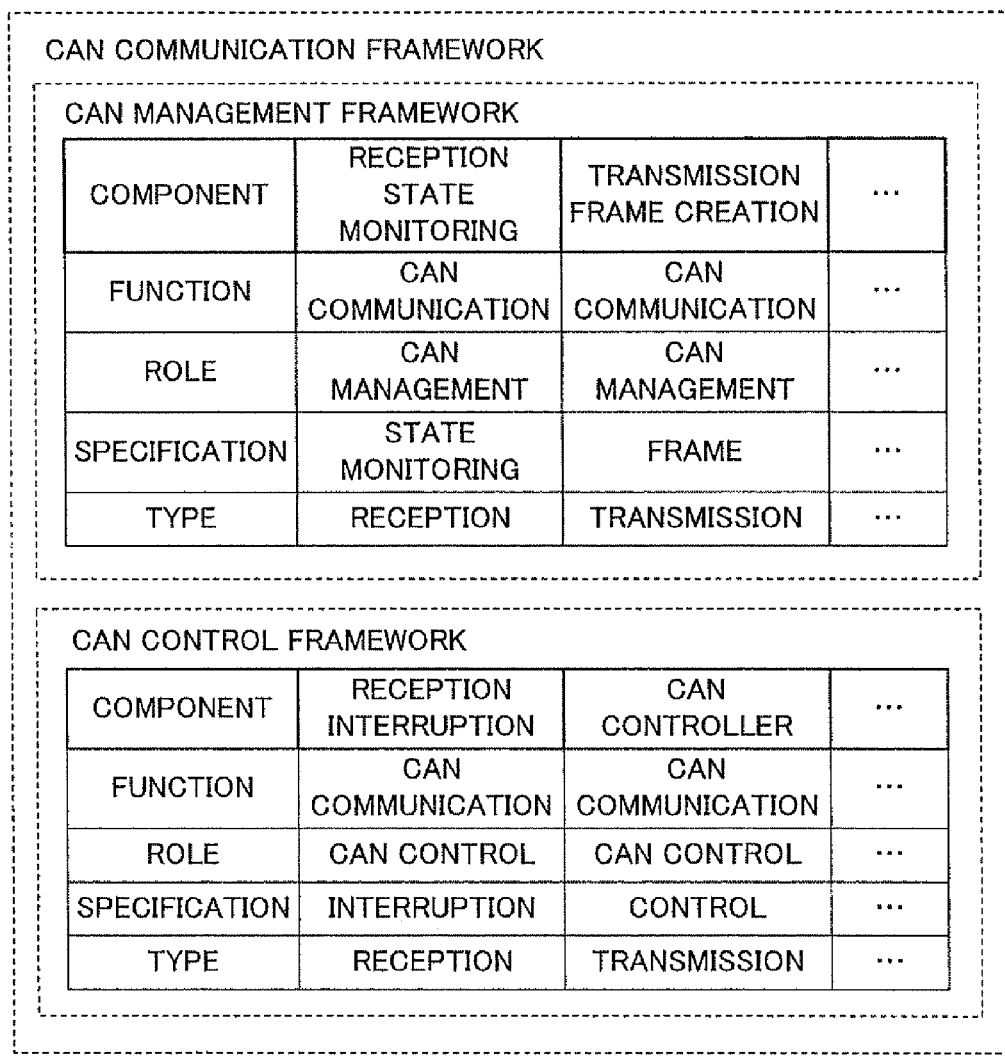

CONTROL APPARATUS, CONTROL METHOD, AND RECORDING MEDIUM

This application is the national phase under 35 U.S.C. §371 of PCT International Application No. PCT/JP2009/003581 which has an International filing date of Jul. 29, 2009 and designated the United States of America.

BACKGROUND

1. Technical Field

The present invention relates to a control apparatus that performs various controls based on a computer program. Particularly, the present invention relates to a control apparatus, a control method and a computer program capable of shortening the developmental process and reducing the developmental load by enabling control that flexibly handles various required specifications and improving the reusability of programs by constructing the computer program so that various functions can be selected and combined based on the attributes thereof.

2. Description of Related Art

In recent years, in various fields, a system has been used in which a control apparatus that performs various controls is provided with a communication function, a plurality of such control apparatuses are connected together and the control apparatuses are each assigned with a function, exchange data with each other and are caused to perform various processings in concert with each other. For example, in the field of vehicle-mounted LANs (local area networks) disposed in vehicles, ECUs (electronic control units) have a communication function, and are each caused to perform a specific processing and exchange data with each other, thereby implementing various function as a system (see, for example, Japanese Patent Application Laid-Open No. 2007-329578).

When a plurality of control apparatuses are caused to perform various processings in concert with each other, by constructing a structure that enables the control apparatuses to implement a similar function instead of causing each control apparatus to specialize in a specific function, the control apparatuses can be enabled to perform a processing while substituting for each other according to the setting. Specifically, a common function is separated from the application programs for causing the control apparatuses to implement a specific function, and is implemented by a program serving as a platform. Examples of the common function include the storage and update of data used for executing an application program and the processing of communication with other apparatuses.

Thereby, when the definition of the communication specification is changed, the platform program is changed, so that all the control apparatuses are caused to execute the changed platform program. In this case, it is unnecessary for the application program to cope with the change in communication specification, and communication with other control apparatuses can be implemented by a processing similar to before. Consequently, cumbersome management is unnecessary such as the preparation of various versions of application programs conforming to the difference in hardware. The application program may be constructed so as to purely implement a specific function, so that program reusability is increased.

SUMMARY

Not only the structure of the application program but also the structure of the platform program differs according to the difference in hardware resources. There is a function that is necessary or unnecessary according to the difference in the purpose of use, place of use and grade of the control apparatus. For both the application program and the platform program, it is cumbersome to change the program for each of different vehicle types, destinations and grades, hindering improvement in reusability.

When an application program and a platform program changed according to the difference in purpose of use, place of use, grade and program or hardware specifications are prepared, the cumbersomeness may not be avoid in development of the control apparatus using such programs and the entire system itself including the control apparatus. Further, in a case where a large-scale system is constructed by a plurality of control apparatuses having different hardware resources, when a program changed specifically for each apparatus is prepared, it is difficult to change the system configuration in addition to cumbersome program management, making it impossible to cope with various system configurations.

The present invention is made in view of such circumstances, and an object thereof is to provide a control apparatus, a control method and a computer program capable of shortening the developmental process and reducing the developmental load by enabling control that flexibly handles various required specifications and improving the reusability of programs by constructing an application program and a platform program as a set of module parts in function units, associating the module parts by the attribute of the function and enabling various functions to be selected or combined based on the attribute.

A control apparatus according to a first aspect comprises: a first executing means for executing one or more application programs; and a second executing means for executing a platform program that controls an operation of a hardware resource in response to a request from the application program. In the control apparatus, the first and second executing means are each provided with a plurality of function executing means, the plurality of function executing means are each related with attribute information representative of an attribute of a function, and the control apparatus further comprises: a means for selecting attribute information; and a means for associating a function executing means with which the attribute information is related in common.

In a control apparatus according to a second aspect, the attribute information includes one or more pieces of information among information representative of a content of a function, information representative of a role of the function and information representative of a link with another function.

A control apparatus according to a third aspect comprises a means for, when a function is selected, executing another function executing means associated with the corresponding function executing means.

A control method according to a fourth aspect, controlling a hardware resource by executing one or more application programs and executing a platform program that controls an operation of the hardware resource in response to a request from the application program, comprises steps of: separating the application program or the platform program so as to be independently executable in function units executed based on the application program or the platform program; relating the function units with attribute information representative of attributes of the functions; extracting, when attribute information is selected, functions with which the attribute information is related in common; and associating the extracted functions with each other.

A computer program according to a fifth aspect that, to cause a computer to control an operation of a hardware resource, includes a plurality of program parts separated in predetermined function units and causes the computer to construct a control program with which attribute information representative of an attribute of each function is related, comprises: a step of causing the computer to select attribute information; a step of causing the computer to extract the program parts of the function units related with the selected attribute information in common; and a step of causing the computer to associate the extracted program parts with each other.

In the first, fourth and fifth aspects, the application program and the platform program can be separated into a plurality of function units which can be executed independently of each other. Further, the function units are each related with attribute information representative of the attribute of the function, and the function units associated with common attribute information can be treated as an aggregate by being associated with each other. The manner of relation as an aggregate can be changed according to the selection of the attribute information, so that the program construction of the apparatus can be easily changed.

In the second aspects, attribute information including one or more pieces of information among the information representative of the content of the function, the information representative of the role of the function and the information representative of the link with another function is related with the function units of the programs. It is possible to relate a plurality of pieces of attribute information with one function unit. By the attribute information to be selected, various associations based on functions are possible such as association of function units having the target of functions in common and association of function units having the operation implemented by function in common.

In the third aspect, when a function is selected, another function with which the attribute information of the selected function is associated is also selected and executed. Since it is possible to associate functions in various ways, when a function is selected, the function executed as a corresponding function is diversified. That is, the association between functions can be easily diversified.

According to the present invention, since the association as the combination of functions can be changed by selection of the attribute of a function, control that flexibly handles various required specifications can be performed. Further, when a control system including a plurality of control apparatuses is constructed, functions in each control apparatus can be variously changed according to the specifications of the entire system. As described above, since various specifications can be flexibly handled even by one program, program reusability is improved, so that the developmental process can be shortened and the developmental load can be reduced.

The above and further objects and features will move fully be apparent from the following detailed description with accompanying drawings.

BRIEF DESCRIPTION OF THE SEVERAL VIEWS OF THE DRAWINGS

FIG. 4 is an explanatory view showing frameworks included in a platform layer and an example of the contents of the components included in the frameworks;

DETAILED DESCRIPTION

Hereinafter, the present invention will be concretely described based on the drawings showing an embodiment thereof.

In the embodiment shown below, a control system in which a control apparatus according to the present invention is applied to ECUs (electronic control units) mounted on a vehicle and performing various controls and the ECUs are connected together by a communication line to perform processings in concert with each other will be described as an example.

Figure 1:
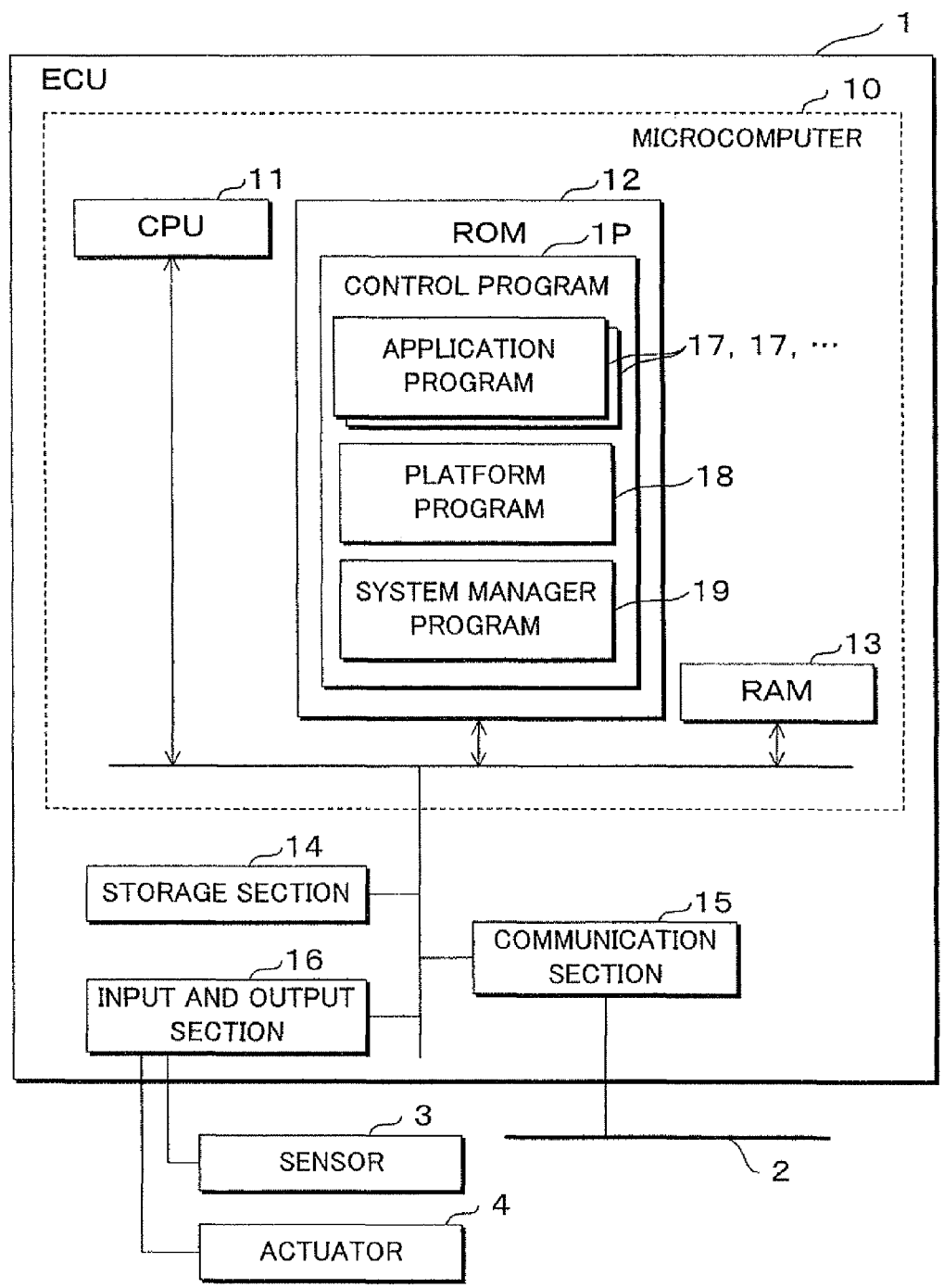
FIG. 1 is a block diagram showing the structure of an ECU according to the present embodiment.

FIG. 1 is a block diagram showing the structure of the ECU according to the present embodiment. The ECU 1 is connected to the other ECUs through a communication line 2 so that it can communicate with them. A sensor 3 and an actuator 4 are connected to the ECU 1. The ECU 1 has a specific function such as operating of the actuator 4 based on the information obtained by its own processing based on the information obtained from the sensor 3, or the processing by another ECU. While both of the sensor 3 and the actuator 4 are connected to the ECU 1, only either one of them or none of them may be connected.

The ECU 1 comprises: a microcomputer 10 (hereinafter referred to as MC 10) including a CPU (Central Processing Unit) 11 that controls the operations of structural members, a ROM 12 as which a nonvolatile memory is used, and a RAM 13 as which a quick access memory is used; a storage section 14 as which a nonvolatile memory is used; a communication section 15 as which a network controller is used; and an input and output section 16 serving as an interface with the sensor 3 and the actuator 4.

As the storage section 14, a memory such as a flash memory or an EEPROM (Electrically Erasable and Programmable ROM) is used. The storage section 14 has a comparatively large capacity. The storage section 14 stores information obtained by the processing performed by the MC 10 executing application programs 17, 17 . . . described later, for example, system information such as information on the state of the ECU 1 and information on the state of the vehicle on which the ECU 1 is mounted. The storage section 14 also stores data obtained from the sensor 3 by the MC 10 and data received from the other ECUs.

The communication section 15 implements communication with the other ECUs through the communication line 2 by the MC 10. Specifically, the communication section 15 implements communication conforming to a protocol such as CAN (control area network), LIN (local interconnect network) or FlexRay (registered trademark). The communication section 15 may be formed as a part of the MC 10.

The input and output section 16 is an interface with the sensor 3 and the actuator 4 as mentioned above. When the sensor 3 is connected thereto, the input and output section 16 extracts a signal representative of a measurement value or the like outputted from the sensor 3, and outputs it to the MC 10. When the actuator 4 is connected thereto, the input and output section 16 outputs a control signal of the actuator 4 outputted from the MC 10, to the actuator 4. The input and output section 16 may have D/A conversion and A/D conversion functions.

The CPU (Central Processing Unit) 11 of the MC 10 controls structural members by reading a control program 1P stored in the ROM 12 into the RAM 13 and executing it, thereby implementing a specific function.

As the ROM 12, a memory such as a mask ROM, a flash memory, a PROM (Programmable ROM), an EPROM (Erasable and Programmable ROM) or an EEPROM (Electrically EPROM) is used. The ROM 12 stores the control program 1P as mentioned above and may also store control data used for control.

As the RAM 13, a memory such as a DRAM (Dynamic Random Access Memory) or an SRAM (Static Random Access Memory) is used. The RAM 13 temporarily stores various pieces of information generated by the processing by the CPU 11.

The control program 1P stored in the ROM 12 includes: the application programs 17, 17 . . . for causing the MC 10 to execute processing specific to the ECU 1; a platform program 18 including various programs for implementing functions common to the other ECUs, such as the control of hardware resources and the communication function; and a system manager program 19 that controls the processing based on each program as the entire ECU 1.

The application programs 17, 17 . . . include various programs for implementing functions specific to the ECU 1, such as a program that implements the processing to control the engine of a vehicle and a program that implements the processing to switch the door locks, the head lights and the like between on and off.

The platform program 18 includes a program that implements the processing on each hardware resource in response to a processing request on the hardware resource from the MC 10 based on the application programs 17, 17 . . . , such as data writing into the storage section 14, data reading from the storage section 14 and data transmission through the communication section 15. Specifically, the platform program 18 includes: a resource manager corresponding to the device driver that implements the logical data access responsive to the processing request from the CPU 11 that executes the application programs 17, 17 . . . ; and a resource controller corresponding to the BIOS (Basic Input/Output System) that implements the physical data access based on the mounting of each hardware resource.

The system manager program 19 is a program for causing the whole of the processing based on the application programs 17, 17 . . . , the processing based on the platform program 18 and the processing based on the system manager program 19 executed by the CPU 11 to be controlled according to what the ECU 1 should function as. For example, a function is implemented of switching the processing based on each program according to the difference in situation such as whether the ECU 1 is to perform an operation performed in the test stage prior to shipment, to perform an operation performed in service or to perform an operation performed in maintenance. Moreover, a function is implemented of switching the processing based on each program according to whether the ECU 1 is to be ready for Japanese specification vehicles or for North American specification vehicles. Moreover, for example, a function is implemented of changing the physical control method for the hardware resources according to the application programs 17, 17 . . . being executed.

Figure 2:
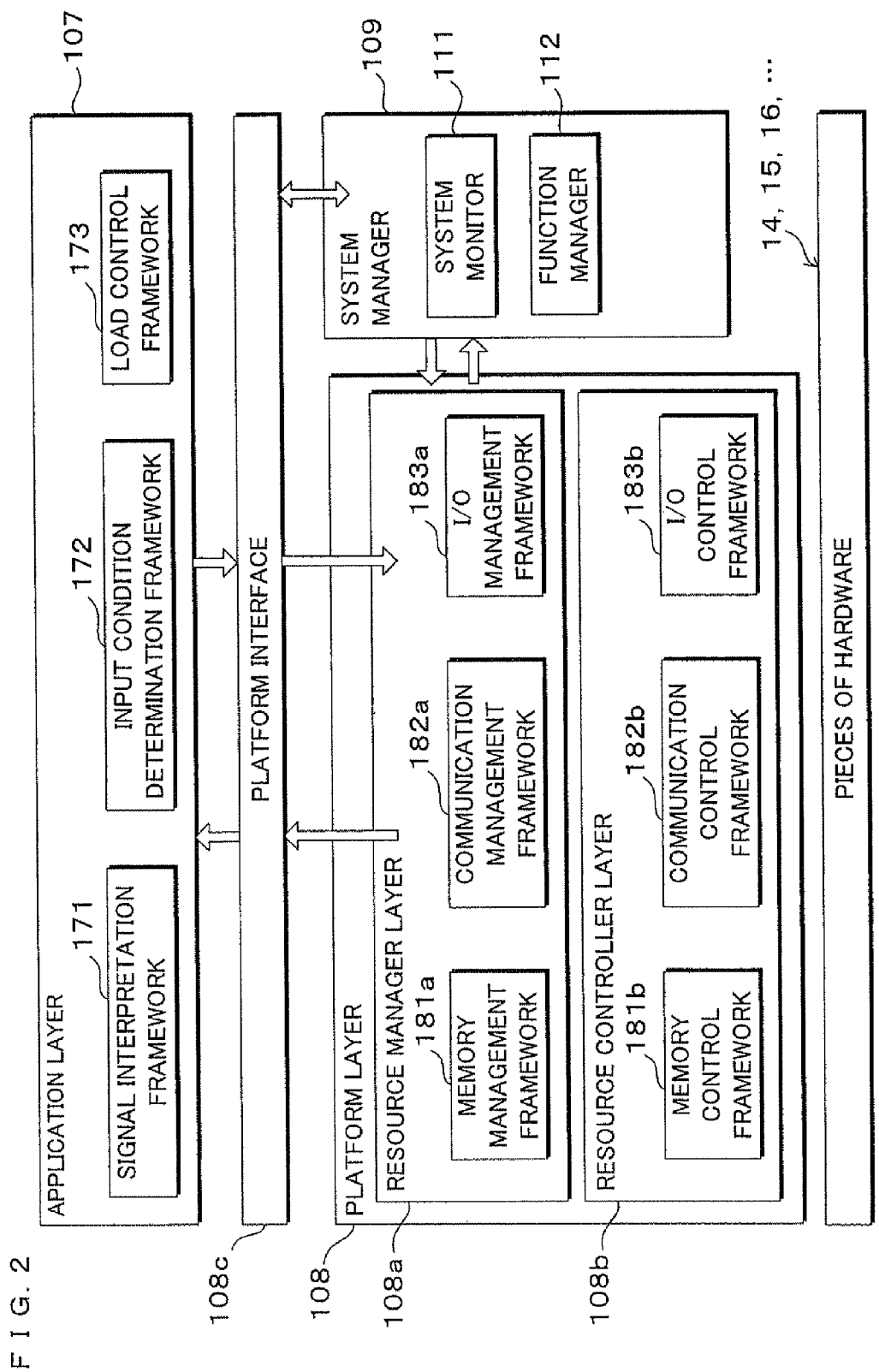
FIG. 2 is an explanatory view for conceptually explaining functions implemented by a CPU of the ECU according to the present embodiment.

FIG. 2 is an explanatory view for conceptually explaining functions implemented by the CPU 11 of the ECU 1 according to the present embodiment. The CPU 11 reads the control program 1P stored in the ROM 12 into the RAM 13, and executes it. As mentioned above, the control program 1P includes the application programs 17, 17 . . . , the platform program 18 and the system manager program 19. The CPU 11 operates in a software structure broadly divided into two layers of an application layer 107 and a platform layer 108, based on the programs included in the control program 1P. Further, the CPU 11 operates as a system manager 109 in an equivalent layer to the platform layer 108.

The application layer 107 and the platform layer 108 are connected by a platform interface 108c, and processing request or information passing is possible by the platform interface 108c being called.

In the application layer 107, the CPU 11 functions as various applications for implementing specific functions based on the application programs 17, 17 . . . The applications executed by the application programs 17, 17 . . . are constructed as function frameworks including a plurality of components separated based on the target, role or the like of the functions implemented by the applications. In the example shown in FIG. 2, the application layer 107 includes a signal interpretation framework 171 which is an aggregate of components that implement the function of interpreting the data (signal) obtained from the platform layer 108 side. Moreover, the application layer 107 includes an input condition determination framework 172 which is an aggregate of components that implement condition determination functions such as the turning on and off of various controlled objects and a load control framework 173 which is an aggregate of components that implement functions for controlling the actuator 4 (load).

In the platform layer 108, the processing to actually control the pieces of hardware 14, 15, 16, . . . based on the platform program 18 is performed by the CPU 11. For example, functions such as data reading and writing with the storage section 14 and data passing with the communication section 15 are implemented. The platform layer 108 is further layered inside into a resource manager layer 108a in which the function of executing a logical access such as the provision of an instruction concerning which data is to be read from the storage section 14 is implemented and a resource controller layer 108b in which the function of executing a physical access such as the writing of actually transmitted data into the I/O memory of the communication section 15 is implemented.

In the platform layer 108, functions that control hardware resources are also implemented by a function framework including a plurality of components separated based on the target, role or the like of the functions. In the example shown in FIG. 2, the resource manager layer 108a includes, regarding the reading and writing from and into a memory such as the storage section 14, a memory management framework 181a which is an aggregate of components that implement the function of determining which data is read from the memory and which data is written thereinto, in response to a request from the application layer 107. In addition, the resource manager layer 108a includes a communication management framework 182a which is an aggregate of components that implement the communication management function of providing an instruction to transmit data to the communication section 15. The resource manager layer 108a also includes an I/O management framework 183a which is an aggregate of components that implement the function of managing data input and output to and from an I/O device.

The resource controller layer 108b includes a memory control framework 181b which is an aggregate of components that implement the memory control function of identifying the address of data, in the memory, actually reading the data and actually writing the data based on an instruction from the memory management framework 181a. In addition, the resource controller layer 108b includes a communication control framework 182b which is an aggregate of components that implement the communication control function of actually inputting and outputting data to and from the communication section 15. The resource controller layer 108b also includes an I/O control framework 183b which is an aggregate of components that actually access the I/O memory of an I/O device to implement the input and output function.

Further, the CPU 11 reads the system manager program 19 and executes it to thereby implement the function of the system manager 109, sharing the interface with the platform layer 108. The system manager 109 implements: a system monitor 111 of detecting the execution conditions at the components activated in various frameworks that function in each layer over both of the application layer 107 and the platform layer 108 and holding information; and a function monitor 112 that provides an instruction on, for example, what function of component is to be activated from various frameworks in each layer according to the vehicle type, destination and grade of the vehicle on which the ECU 1 is mounted and the switching of the function of the ECU 1. The system manager 109 may be capable of directly exchanging information with the function of each layer instead of sharing the interface with the platform layer 108 as shown in FIG. 2.

Figure 3:
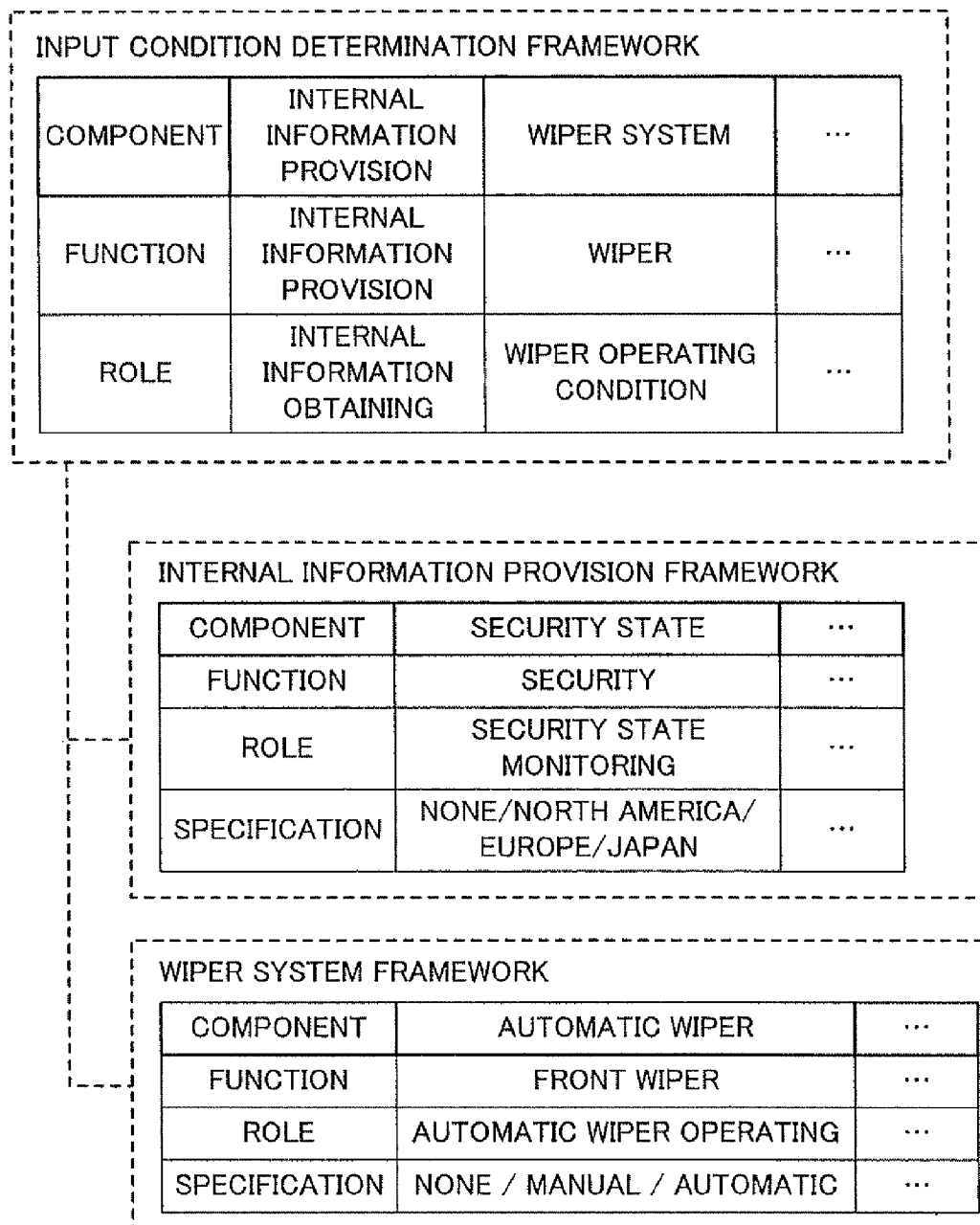
FIG. 3 is an explanatory view showing frameworks included in an application layer and an example of the contents of the components included in the frameworks.

Next, examples of the frameworks for implementing the functions as shown in FIG. 2 will be described. Both the application programs 17, 17 . . . and the platform program 18 are mounted in a state where program modules corresponding to the components into which functions are minutely separated are combined as shown in FIGS. 3 and 4. Further, the program modules corresponding to the components are related with attribute information, are capable of operating as a framework which is an aggregate of components, and are capable of selectively executing the components.

FIG. 3 is an explanatory view showing frameworks included in the application layer 107 and an example of the contents of the components included in the frameworks. As shown in FIG. 3, for example, the input condition determination framework 172 includes an internal information provision component that implements the function of providing information from a hardware resource and a wiper system component that implements the function of determining the condition of input to the wipers. The components included in the input condition determination framework 172 are each constructed as a framework including a plurality of components. The internal information provision component constructs an internal information provision framework including a security state component that implements the function of providing notification of the security state. The wiper system component includes automatic wiper components each implementing a function for each type of wiper, and constructs a wiper system framework. Thus, each framework has a hierarchical structure.

The components implemented by the application programs 17, 17 . . . and the platform program 18 according to the present embodiment are related with a plurality of pieces of attribute information including functions or roles such as the targets of the functions and the operation implemented by the functions. For example, in the example shown in FIG. 3, the internal information provision component is related with "internal information provision" as the function attribute and related with "internal information obtaining" as the role attribute. Moreover, for example, the security state component included in the internal information provision framework is related with specifications such as "security" as the function attribute, "security state monitoring" as the role attribute and "none/North America/Europe/Japan" as destination specifications. Specifically, information for identifying the program module that implements each framework and the pieces of attribute information are stored in the ROM 12 in a state of being related with each other, and can be identified from the CPU 11.

Moreover, the components can be managed by attribute information. FIG. 4 is an explanatory view showing frameworks included in the platform layer 108 and an example of the contents of the components included in the frameworks. The communication management framework 182a shown in FIG. 2 includes, as one component, a CAN management component that implements the function of managing communication based on CAN which is a communication protocol. The communication control framework 182b includes, as one component, a CAN control component that implements the function of controlling a communication module conforming to the CAN protocol. The CAN management component is constructed, as shown in FIG. 4, as a CAN management framework including components such as a reception state monitoring component that implements the function of monitoring the reception state and a transmission frame creation component that implements the function of creating a transmission frame. The CAN control component is also constructed, as shown in FIG. 4, as a CAN control framework including a reception interruption component that implements a reception interruption function and a CAN controller component that implements the function of physically controlling the CAN controller.

In the example shown in FIG. 4, the role attributes of the components included in the CAN management framework are all indicated as "CAN management." That is, the CAN management framework includes components related with the role attribute "CAN management." Likewise, the role attributes of the components included in the CAN control framework are all indicated as "CAN control," and the CAN control framework includes components related with the role attribute "CAN control." The components included in the CAN management framework and the CAN control framework are all related with "CAN communication" as the function attribute. Thereby, in the example shown in FIG. 4, the components having the function attribute "CAN communication" in common also construct a "CAN communication framework."

Thus, each component can belong to a plurality of frameworks. That is, components that implement the same function can be reused for components that implement a different function. Moreover, in the example shown in FIG. 4, the components are related with not only functions and roles but also specifications, operation types and the like as attributes.

Therefore, if the components are associated by an operation type, for example, "reception" as the attribute information, a framework that implements a new function can be constructed by associating components such as a "reception frame work" including the reception state monitoring component and the reception interruption component.

Figure 5:
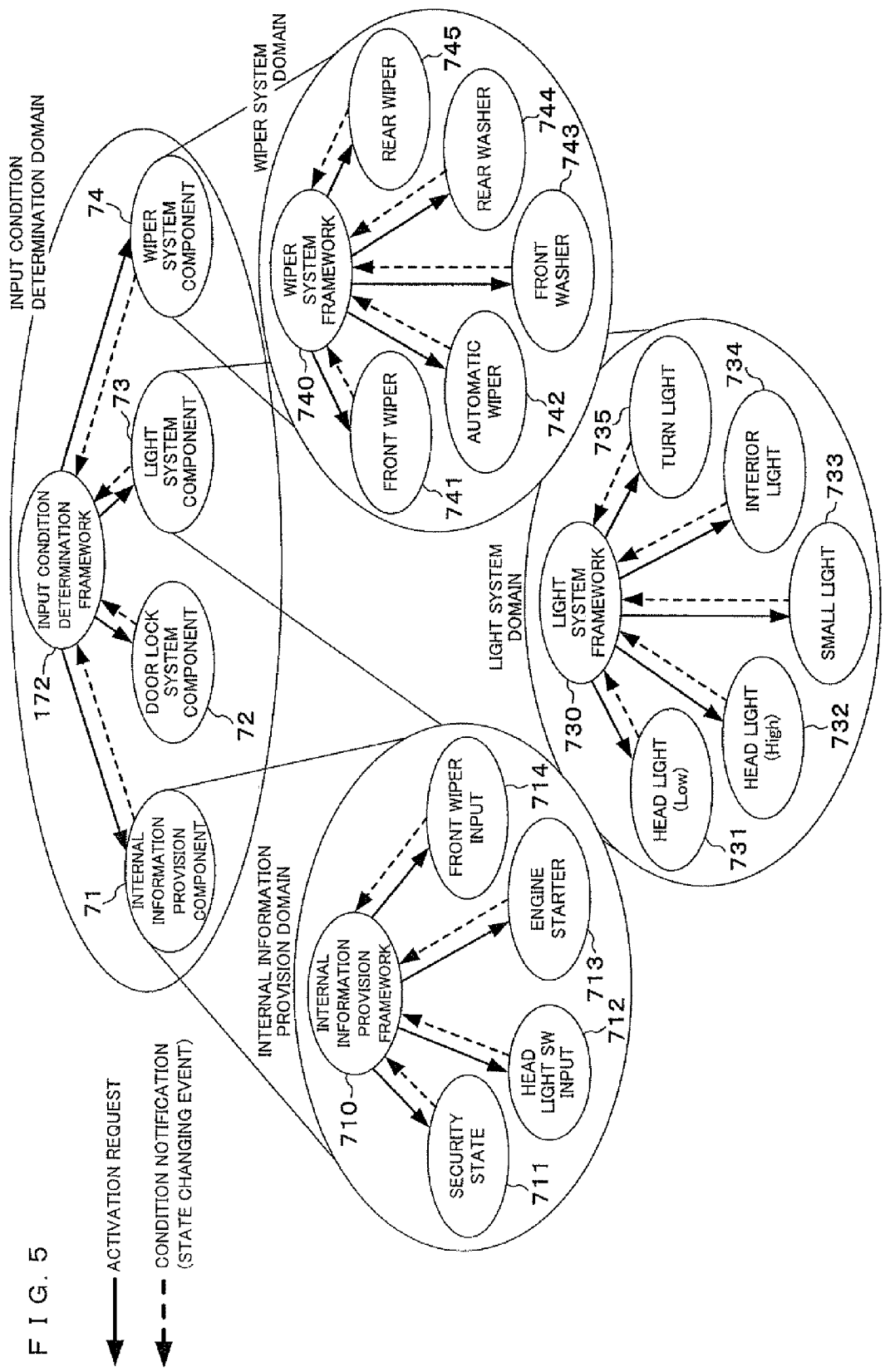
FIG. 5 is an explanatory view conceptually showing the hierarchical structure of an input condition determination framework included in the application layer.

Next, the hierarchical structure between the frameworks and the components will be described with reference to the drawings. FIG. 5 is an explanatory view conceptually showing the hierarchical structure of the input condition determination framework 172 included in the application layer 107. The input condition determination framework 172 includes: an internal information provision component 71 that implements the function of providing information such as the condition at hardware resources; a door lock system component 72 that implements various functions related to door lock control; a light system component 73 that implements various functions related to light control; and a wiper system component 74 that implements various functions related to wiper control.

Further, the components 71, 72, 73 and 74 are each hierarchically constructed as a framework, and include components that implement detailed functions. For example, the internal information provision component 71 is constructed as an internal information provision framework 710 including: a security state component 711 that provides notification of the security state; a head light SW input component 712 that inputs the on/off condition of the head light switch (SW) to the application layer 107; an engine starter component 713 that provides notification of the engine starter; and a front wiper input component 714 that inputs the condition of the front wipers to the application layer 107. Likewise, the light system component 73 is constructed as a light system framework 730 including a head light (low) component 731, a head light (high) component 732, a small light component 733, an interior light component 734 and a turn light component 735 that determine the conditions for input to the head lights (low), the head lights (high), the small lights, the interior light and the turn lights, respectively. The wiper system component 74 is constructed as a wiper system framework 740 including a front wiper component 741, an automatic wiper component 742, a front washer component 743, a rear washer component 744 and a rear wiper component 745 that determine the conditions for input to the front wipers, the automatic wipers, the front washer, the rear washer and the rear wiper, respectively.

As shown in FIG. 5, the frameworks in the application layer 107 are identified by the domains classified by function, and have components hierarchically.

Figure 6:
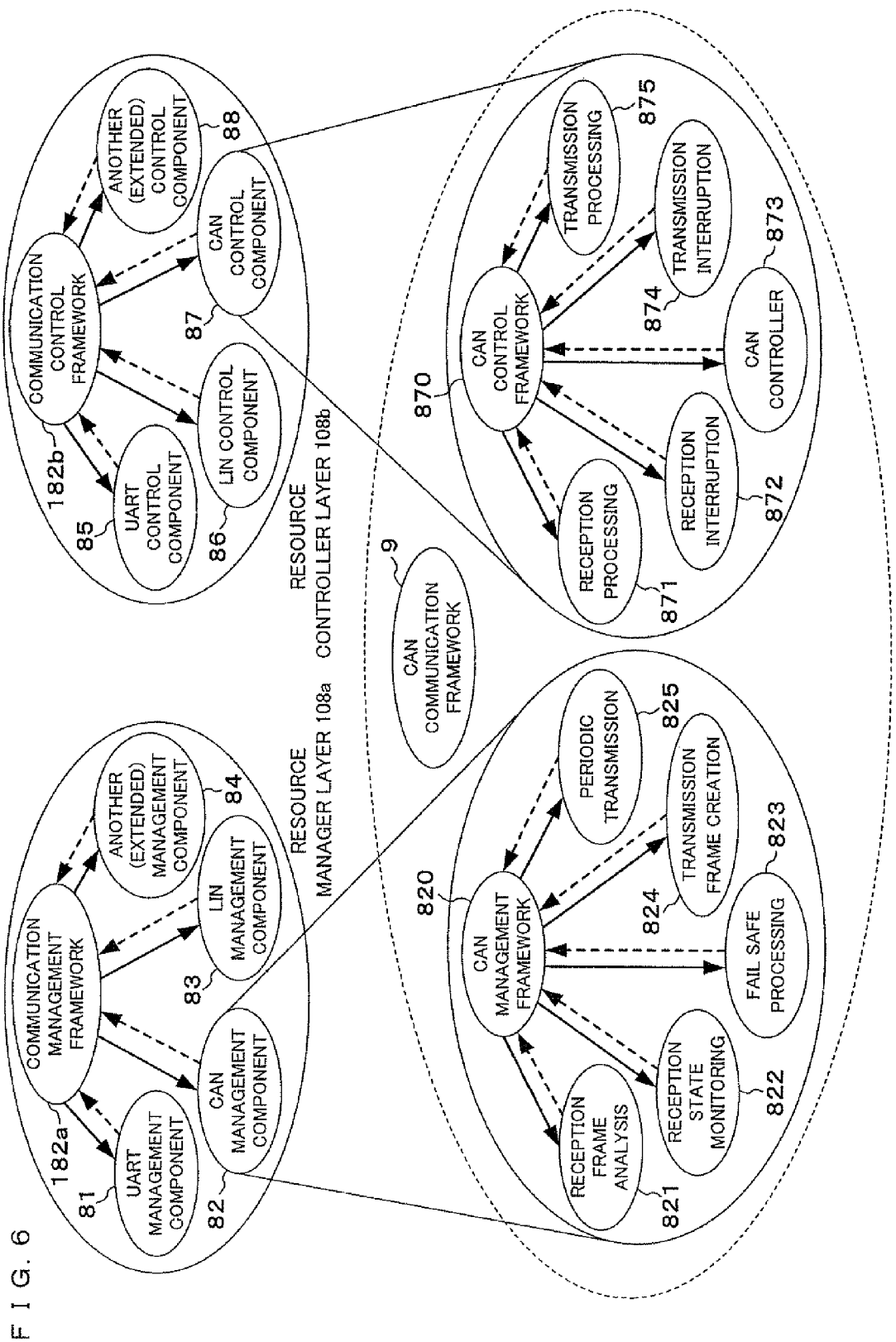
FIG. 6 is an explanatory view conceptually showing the hierarchical structure of a communication management framework and a communication control framework included in the platform layer.

FIG. 6 is an explanatory view conceptually showing the hierarchical structure of the communication management framework 182a and the communication control framework 182b included in the platform layer 108. The communication management framework 182a includes: a UART (Universal Asynchronous Receiver Transmitter) management component 81 that implements the management function of the UART; a CAN management component 82 that implements the function of CAN communication; a LIN management component 83 that implements the function of LIN communication; and another (extended) management component 84 that implements the function of communication based on another protocol. The communication control framework 182b includes: a UART control component 85 that implements the control of the UART; a LIN control component 86 that implements the control function of the LIN controller; a CAN control component 87 that implements the control function of the CAN controller; and another (extended) control component 88 that implements the control function of a communication controller based on another protocol.

The CAN management component 82 constructs a CAN management framework 820 including: a reception frame analysis component 821 that implements a reception frame analysis function; a reception state monitoring component 822 that implements a reception state monitoring function; a fail safe processing component 823 that implements a fail safe processing function; a transmission frame creation component 824 that implements a transmission frame creation function; and a periodic transmission component 825 that implements periodic transmission. The CAN control component 87 constructs a CAN control framework 870 including: a reception processing component 871 that implements a reception processing function; a reception interruption component 872 that implements a reception interruption function; a CAN controller component 873 that controls a CAN controller; a transmission interruption component 874 that implements a transmission interruption function; and a transmission processing component 875 that implements a transmission processing function. Since the CAN management framework 820 and the CAN control framework 870 both have a function attribute "CAN communication" in common as a component, they construct a CAN communication framework 9.

The frameworks and components as shown in FIGS. 5 and 6 operate in a hierarchical structure in which a component in an upper layer provides any of the components in a lower layer with notification of an activation request in response to an instruction from the system manager 109 and the component in the upper layer is notified that the condition of each component is changed in response to the activation request. Thereby, the functions can be selectively implemented, so that efficient control can be performed such as stopping of operations for unnecessary functions. That is, for example, the input condition determination framework 172 makes an activation request to any of the internal information provision component 71, the door lock system component 72, the light system component 73 and the wiper system component 74 and each component provides notification of a condition, whereby the operation of each function is managed by the input condition determination framework 172.

As shown in FIGS. 3 to 6, the attribute information of the included components is different between the application layer 107 and the platform layer 108. However, based on the attribute information, the functions implemented by the frameworks in each of the application layer 107 and the platform layer 108 are clearly classified and each treated as a corresponding aggregate. Moreover, since the components are associated as elements that implement specific functions by attribute information, whether the function is added or deleted can be easily changed by one piece of attribute information. For example, the CAN management component (framework) 82 (820) and the CAN control component (framework) 87 (870) shown in FIGS. 4 and 6 construct the CAN communication framework 9. When there is no need to handle CAN communication in the ECU 1, by selecting "CAN communication" as the attribute information of the component to be deleted, control can be performed so that the whole of the CAN communication framework 9 including the components having CAN communication as the attribute information does not function. Therefore, functions can be deleted and added based on the attribute information in each layer, so that the framework structure can be easily changed according to whether a function (attribute) is used as the reference, a role (attribute) is used as the reference or another attribute information is used as the reference.

Next, with reference to a flowchart, it will be described that the functional structure can be easily changed in the application layer 107 and the platform layer 108 in ECU 1.

Figure 7:
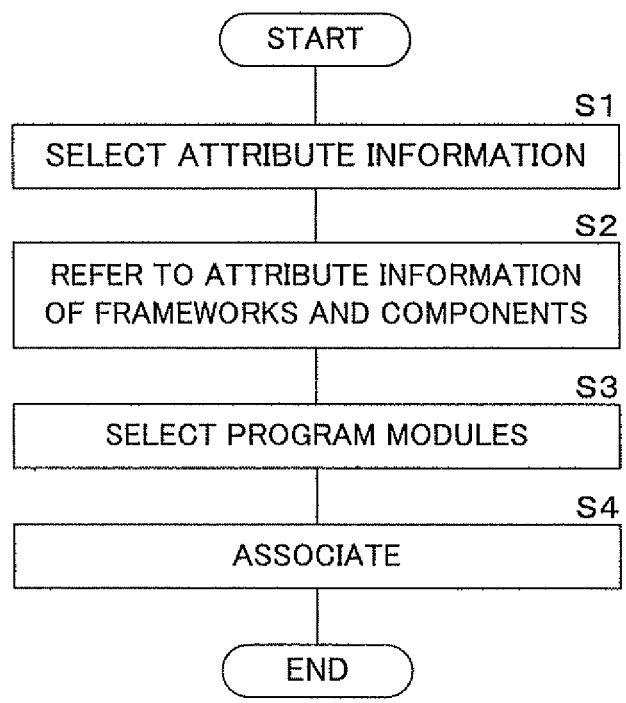
FIG. 7 is a flowchart showing an example of the processing procedure for changing the functional structure of the ECU by a selection of attribute information.

FIG. 7 is a flowchart showing an example of the processing procedure for changing the functional structure of the ECU 1 by a selection of attribute information. This processing is executed by a compiler or the like, for example, when the application programs 17, 17 . . . , the platform program 18 and the system manager program 19 are linked in response to a change in required specifications.

In response to a change in required specifications, the pieces of attribute information corresponding to the required functions are selected based on a control logic (step S1). The pieces of attribute information related with the frameworks and the components included in the application programs 17, 17 . . . and the platform program 18 are referred to (step S2).

The program modules corresponding to the components having in common the pieces of attribute information selected according to the required functions at step S1 are selected from the application programs 17, 17 . . . and the platform program 18 (step S3). The selected program modules are associated by the common attribute information (step S4), and the processing is ended.

By this processing, the functional structure of the ECU 1 can be easily reconstructed according to the required specifications.

Figure 8A:
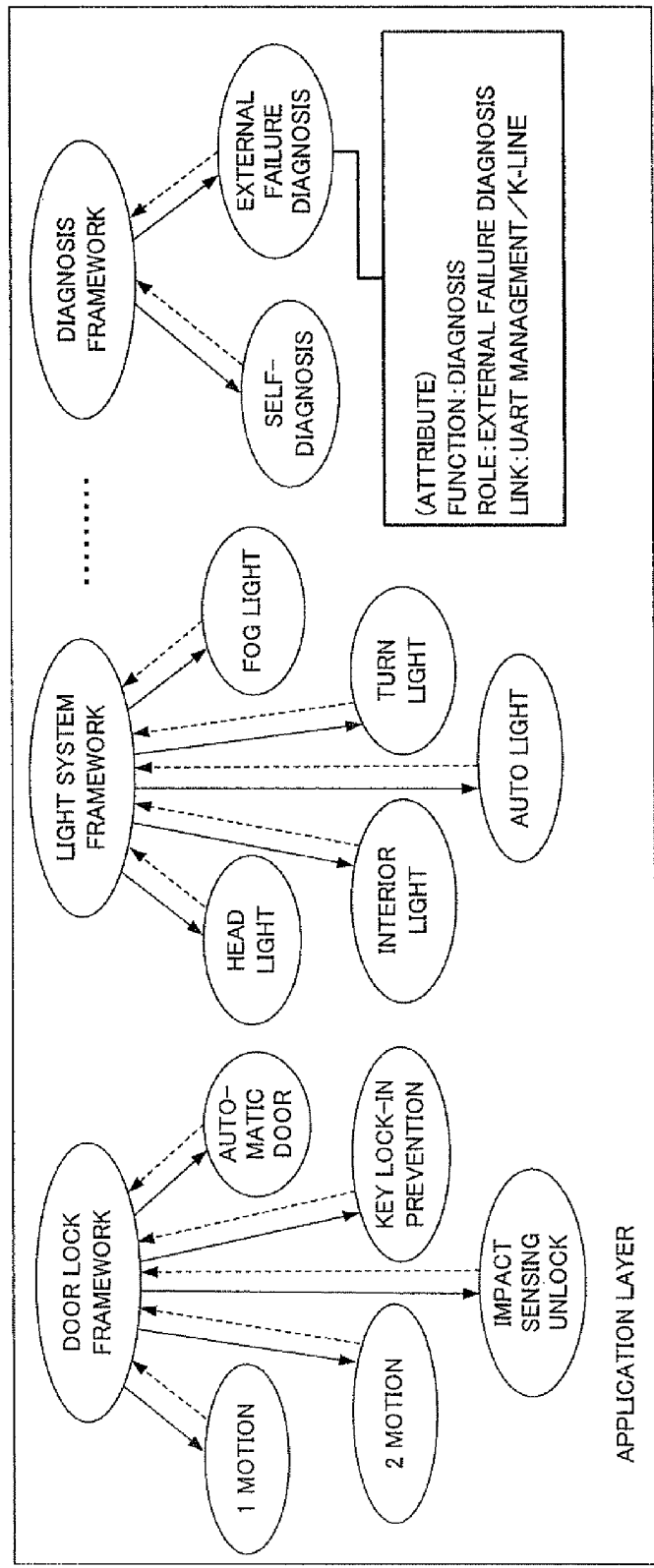
FIG. 8A is an explanatory view showing an example of the structure in a case where link information is included in the attribute information of function frameworks in each layer.
Figure 8B:
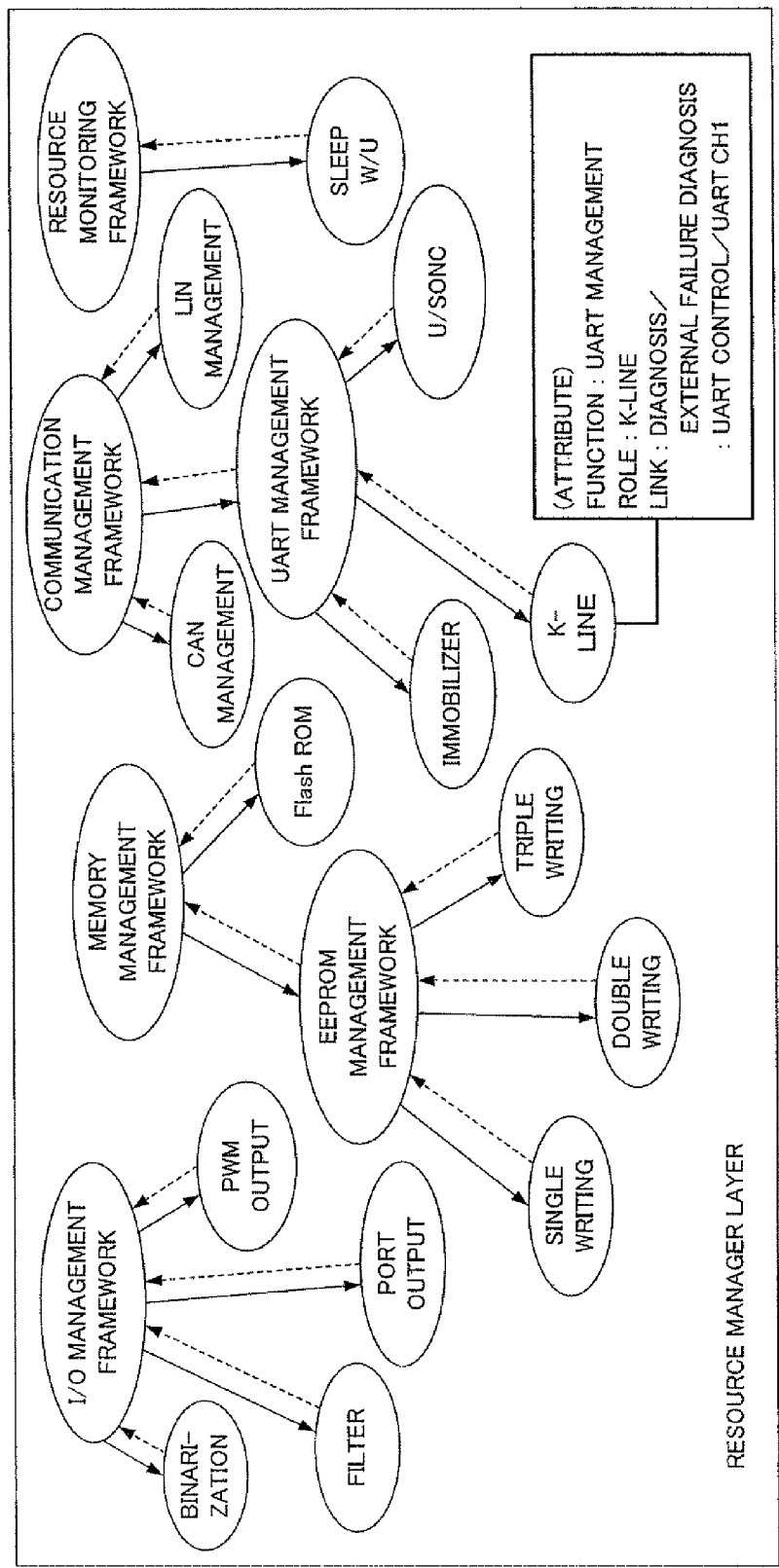
FIG. 8B is an explanatory view showing an example of the structure in the case where the link information is included in the attribute information of function frameworks in each layer.
Figure 8C:
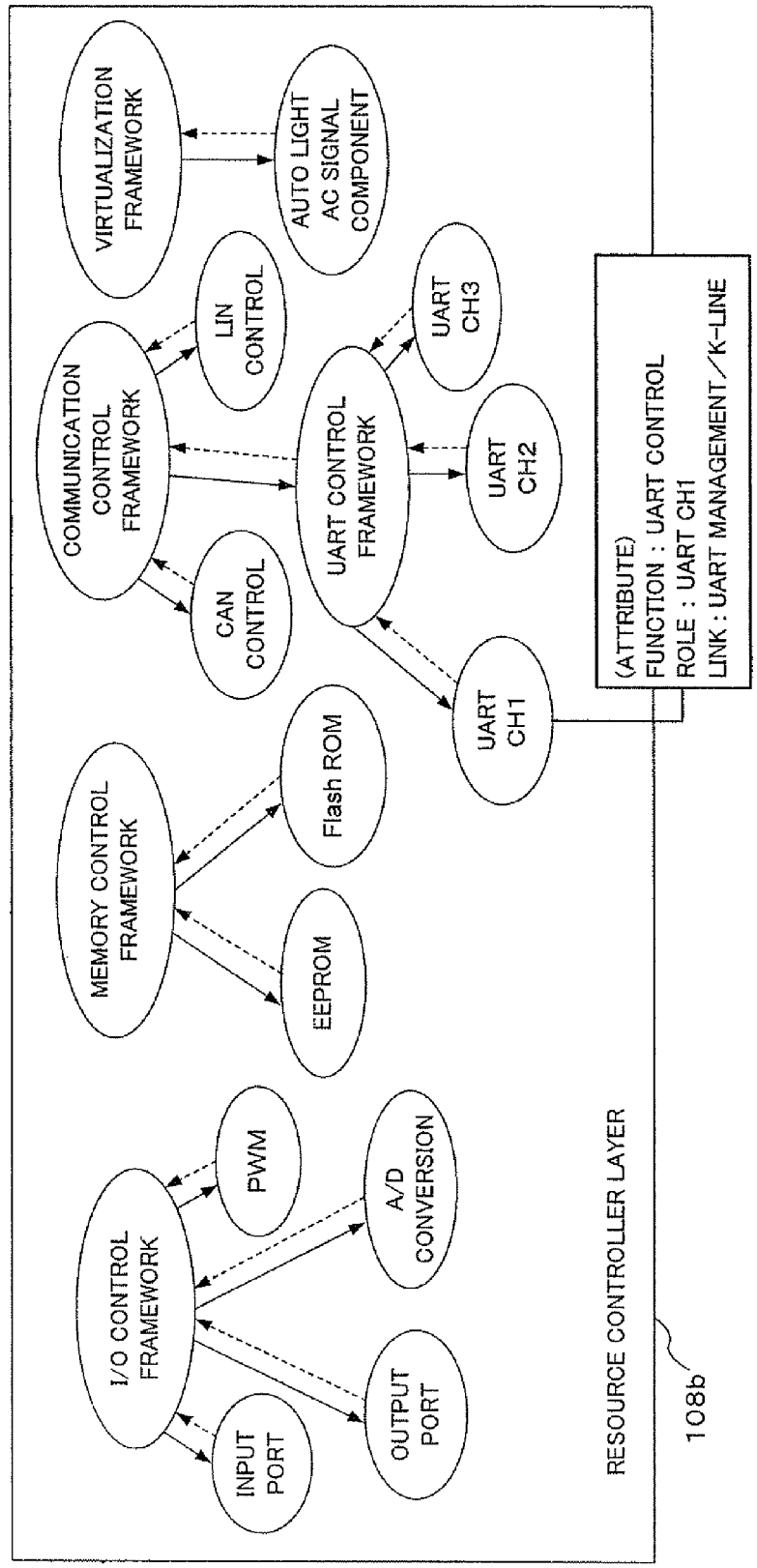
FIG. 8C is an explanatory view showing an example of the structure in the case where the link information is included in the attribute information of function frameworks in each layer.

Further, it is desirable for the attribute information to include the information on the link between the frameworks representative of the relation between the different software layers of the application layer 107 and the platform layer 108. FIGS. 8A, 8B and 8C are explanatory views showing examples of the structure in a case where the link information is included in the attribute information of the function frameworks in each layer.

In the examples of FIGS. 8A, 8B and 8C, the components selected and constructed in each of the application layer 107 (FIG. 8A), and the resource manager layer 108a (FIG. 8B) and the resource controller layer 108b (FIG. 8C) in the platform layer 108 are shown. In the application layer 107, the following frameworks operate: a door lock framework that implements functions related to door lock such as automatic door lock and a key lock-in prevention function; the light system framework 730 that implements the control of the lights; and a diagnosis framework that implements the function of diagnosing the condition of the failure of the vehicle. In the example shown in FIGS. 8A to 8C, the following pieces of information are related as the attribute information of an external failure diagnosis component included in the diagnosis framework: "diagnosis" as the function attribute; "external failure diagnosis" as the role attribute; and "UART management/K-LINE" as the link attribute. That is, it is indicated that the external failure diagnosis component in the application layer 107 (see FIG. 8A) is linked to a component with which "UART management" and "K-LINE" are related as the function attribute and the role attribute in the platform layer 108, that is, a K-LINE component in the resource manager layer 108a (see FIG. 8B). Here, both UART and K-LINE are lines of communication with an external failure diagnosis apparatus connected to the ECU 1 or other ECUs. To implement the external failure diagnosis function, the function of UART management or K-LINE management is necessary in relation. Therefore, the external failure diagnosis component is linked to the K-LINE component.

In the resource manager layer 108a in the platform layer 108, a resource monitoring framework and the like operate as well as the memory management framework 181a, the communication management framework 182a and the I/O management framework 183a (see FIG. 8B). The communication management framework 182a includes the UART management component (framework) 81. Further, the UART management framework includes the K-LINE component. With the K-LINE component, the following pieces of information are related as the attribute information: "UART management" as the function attribute; "K-LINE" as the role attribute; and "diagnosis/external failure diagnosis/UART control/UART CH1" as the link attribute. That is, it is indicated that the K-LINE component in the resource manager layer 108a is linked to a component with which "diagnosis" and "external failure diagnosis" are related as the function attribute and the role attribute in the application layer 107, that is, the external failure diagnosis component in the application layer 107 (see FIG. 8A). It is also indicated that the K-LINE component is linked to a component with which "UART control" and "UART CH1" are related as the function attribute and the role attribute in the resource controller layer 108b, that is, the K-LINE component in the resource manager layer 108a is linked to a UART CH1 component in the resource controller layer 108b (see FIG. 8C).

In the resource controller layer 108b in the platform layer 108, a virtualization framework that emulates the operation of nonexistent hardware and makes a response operates as well as the memory control framework 181b, the communication control framework 182b and the I/O control framework 183b (see FIG. 8C). The communication control framework 182b includes a UART control component (framework) 85. Further, the UART control framework includes the UART CH1 component. With the UART CH1 component, the following pieces of information are related as the attribute information: "UART control" as the function attribute; "UART CH1" as the role attribute; and "UART management/K-LINE" as the link attribute. The UART CH1 component implements the function of controlling communication by CH1 of the UART. It is indicated that the UART CH1 component is linked to a component with which "UART management" and "K-LINE" are related as the function attribute and the role attribute in the resource manager layer 108a, that is, the K-LINE component (see FIG. 8B).

For example, it is now assumed that, when connection with an external apparatus such as an external diagnosis function apparatus is unnecessary, the external failure diagnosis framework is deleted so as not to operate in the application layer 107. At this time, it is possible to delete both of the K-LINE component in the resource manager layer 108a linked to the external failure diagnosis framework and the UART CH1 component in the resource controller layer 108b linked to the K-LINE component to thereby perform reconstruction so that neither of them functions. As described above, by enabling the association between the functions over the layers of the software structure by the link attribute included in the attribute information, functions can be easily deleted and added in conjunction with each other, so that an excellent effect is produced in that various required specifications can be handled.

By this structure, the following effect is produced. For example, there are cases where the communication management function is required to include the state monitoring function according to a specification, while the state monitoring function is required only to be implemented by the function in the application layer 107 according to another specification. According to the structure of the present embodiment, concrete elements of the functions can be flexibly combined according to such a change in specification and this enables the functional structure in the ECU 1 to be easily changed in a wide variety of ways, so that various specification requirements can be easily handled. As described above, since various specifications can be flexibly handled even by one program, program reusability is improved, so that the developmental process can be shortened and the developmental load can be reduced.

In the embodiment described above, an example is shown in which the present invention is applied to ECUs mounted on a vehicle. However, the present invention is not limited thereto, and is applicable to general computer apparatuses that perform various controls.

It should be considered that the embodiment disclosed as described above is illustrative in all aspects and is not limitative. The scope of the invention is indicated not by the meaning described above but by the claims, and all changes that fall within the meaning and scope equivalent to the claims are to be embraced.

The invention claimed is:

1. A control apparatus, comprising:
a processor configured to act as:
a first executing section configured to execute one or more application programs and provided with a plurality of function executing sections respectively related with one or more pieces of attribute information, each of which is representative of an attribute of a function;
a second executing section configured to execute a platform program that controls an operation of a hardware resource in response to a request from the application program and provided with a plurality of function executing sections respectively related with one or more pieces of attribute information, each of which is representative of an attribute of a function, function executing sections with which one piece of the attribute information is related in common being associated;
a selecting section configured to select one piece of attribute information;
a changing section configured to change the association of function executing sections to an association of function executing sections with which the one piece of attribute information selected by the selecting section is related in common;
a stopping section configured to stop function executing sections, the association of which is changed by the changing section; and
an awaking section configured to awake stopped states of function executing sections, the association of which is changed by the changing section,
wherein functional structures of the first executing section and the second executing section are changed by stop and release executed by the stopping section and the awaking section.

2. The control apparatus according to claim 1,
wherein the attribute information includes one or more pieces of information among information representative of a content of a function, information representative of a role of the function and information representative of a link with another function.

3. The control apparatus according to claim 1,
wherein when a function is selected, another function executing section associated with the corresponding function executing section executes a function.

4. A control method controlling a hardware resource, comprising steps of:
executing one or more application programs;
executing a platform program that controls an operation of the hardware resource in response to a request from the application program;
separating the application program or the platform program so as to be independently executable in function units executed based on the application program or the platform program, function units being respectively related with one or more pieces of attribute information, each of which is representative of an attribute of a function and function units with which one piece of attribute information is related in common being associated;
selecting one piece of attribute information;
changing the association of function units to an association of function units with which the selected piece of attribute information is related in common;
stopping the function units, the association of which is changed; and
awaking stopped states of function units, the association of which is changed,
wherein functional structures of the one or more application programs and the platform program are changed by stop of the function units and release of the stopped states by awaking stopped states of function units.

5. The control method according to claim 4,
wherein the attribute information includes one or more pieces of information among information representative of a content of a function, information representative of a role of the function and information representative of a link with another function.

6. A non-transitory computer readable recording medium, in which a computer program is stored that includes:
a plurality of program parts separated in predetermined function units and causes a computer to construct a control program with which one or more pieces of attribute information, each of which is representative of an attribute of a function are respectively related so as to cause the computer to control an operation of a hardware resource,
wherein program parts of the function units with which one piece of the attribute information is related in common are associated with each other,
the computer program causing the computer to perform steps comprised of:
causing the computer to select one piece of attribute information;
causing the computer to change the association of program parts to an association of program parts of function units related with the selected piece of attribute information in common;
causing the computer to stop the program parts, the association of which is changed; and
causing the computer to awake stopped states of the program parts, the association of which is changed,
wherein a functional structure of the control program is changed by stop of the program parts and release of the stopped states in the causing the computer to awake stopped states.

7. The recording medium according to claim 6,
wherein the attribute information includes one or more pieces of information among information representative of a content of a function, information representative of a role of
the function and information representative of a link with another function.

8. A control apparatus, comprising:
a storage device configured to store a computer program including one or more application programs and a platform program that controls an operation of a hardware resource in response to a request from the application program; and an electronic control unit configured to execute the computer program stored in the storage device, wherein each of the application programs and the platform program is composed of a plurality of program parts respectively related with one or more pieces of attribute information, each of which is representative of an attribute of a function, wherein program parts with which one piece of the attribute information is related in common are associated, wherein the electronic control unit performs the steps of:

selecting one piece of attribute information;

changing the association of program parts to an association of program parts with which the selected piece of attribute information is related in common;

stopping the program parts, the association of which is changed; and awaking stopped states of the program parts, the association of which is changed, wherein functional structures of the platform program and at least one of the application programs are changed by stop of the program parts and release of the stopped states in the awaking stopped states of the program parts.

* * * * *